S. HOWARD.
Car Truck.
No. 1,419, 32,423.
Patented May 28, 1861.
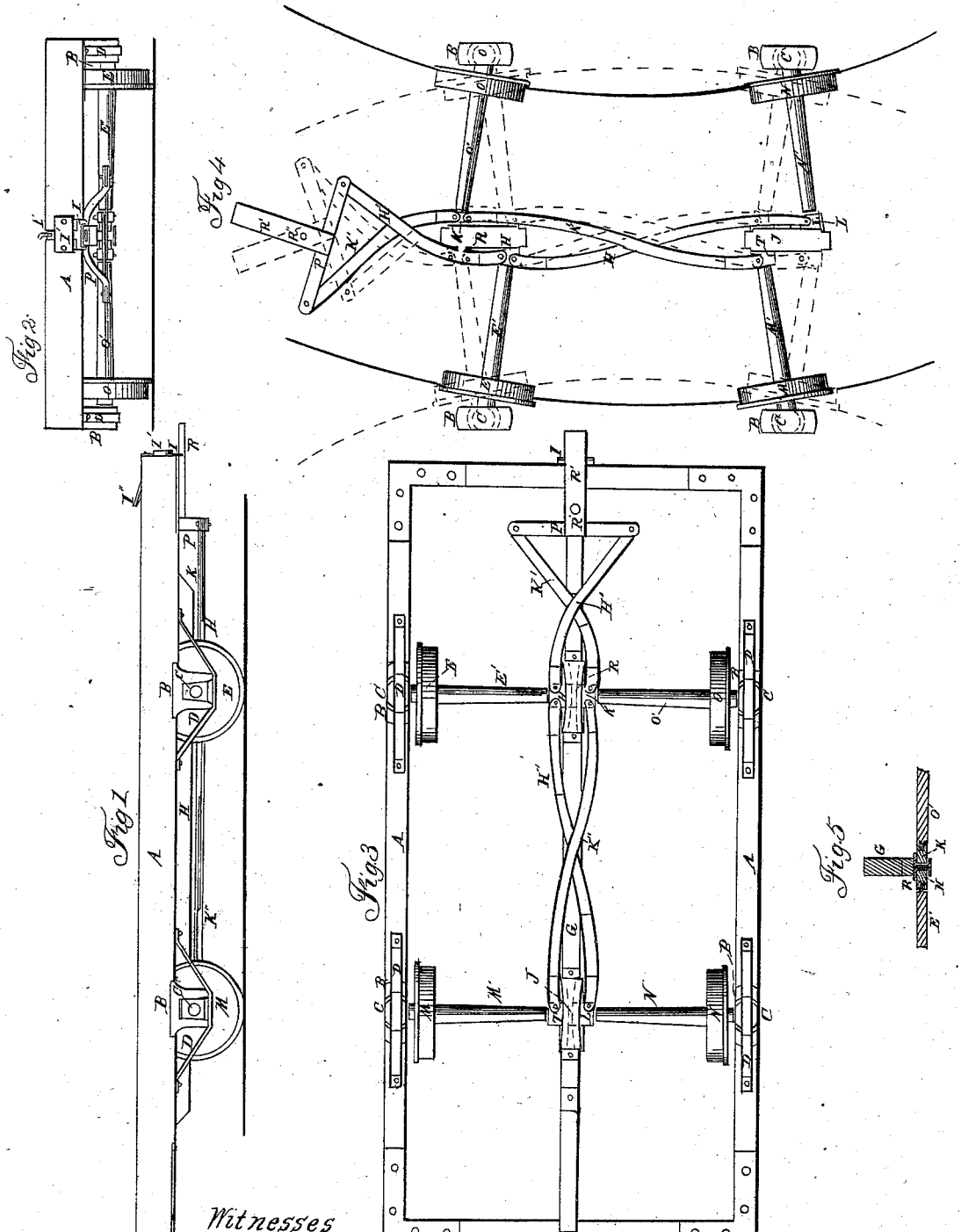
Witnesses
W. H. Burridge
W. O. Howard
Inventor
Sebre Howard

UNITED STATES PATENT OFFICE.

SEBRE HOWARD, OF ELYRIA, OHIO.

RUNNING-GEAR OF RAILROAD-CARS.

Specification of Letters Patent No. 32,423, dated May 28, 1861.

*To all whom it may concern:*

Be it known that I, S. HOWARD, of Elyria, in the county of Lorain and State of Ohio, have invented certain new and useful Improvements in Railroad-Car Running-Gear; and I do hereby declare that the following is a full and complete description of the construction and operation of the same, reference being had to the accompanying drawings, making a part of this specification, in which—

Figure 1, is a side view of the sill and wheels of a car. Fig. 2, is an end view of the same. Fig. 3, is a view of the under side. Fig. 4, represents the position of the wheels and axles, when a car is turning a curve. Fig. 5, is a sectional view.

The same letters refer to like parts in the different views.

My improvement relates to such a construction of axletrees, journal boxes, and adjusting rods or braces, that the car will turn upon a curve, either to the right or left, with the greatest ease, overcoming the cramping and sliding movement of the wheels, and torsion of the axles.

In the drawings A, represents the sill of the car, B, the journal boxes, secured to the under side of the sill, in which are the axle bearings C, that are in the form of a section of a cylinder, placed in a vertical position and are self adjusting in the boxes B, to suit the angles of the axles, to the sides of the car.

D, represents curved braces, secured to the sill, and that pass under the journal boxes, on which the bearings C, rest.

E, Fig. 3, represents one of the car wheels, on the axle E′, the outer end of which revolves in the bearing C, and the other end turns in the adjustable bearing H, that rests and moves, in the elongated journal box R, that is secured to the piece G, extending lengthwise of the car.

The axles M′, N′, and O′, with their wheels M, N, and O, are constructed and arranged like the axle E′, and wheels E, just described. A cross sectional view of the axles, and their bearings H, and K, in the journal box R, is shown in Fig. 5.

To the bearing H, are connected by bolts, the curved rods or braces H′, and H″, and to the bearing K, opposite H, are connected in the same way, the curved rods K′, and K″. H′, and K′, cross each other, and are secured by bolts in the slotted ends of the cross bar P. The curved rods H″ and K″, cross each other, and are connected by bolts to the bearings L, and T, of the axles M′, and N′. In this way the axle O′, is connected with M′, and will move in the same direction, at the same time, and likewise E′, with N′.

R′, is an arm, forming part of the cross bar P, and is secured, to the piece G, by the bolt R″, and also to the tongue of the car.

When the car is going straight forward, the axles, and braces are in the position shown in Fig. 3, and they are kept there, securely, by the clutch I, that holds the arm R′, firmly in place, as shown in Figs. 1, 2, and 3. This clutch passes up through the piece I′, and is connected to the spring I″. By pressing down on this spring, the clutch is raised, and the arm R′, is disengaged, and at liberty to move, to the right or left, by its articulation on the bolt R″. But as it is connected with the tongue, it will be turned in the direction of the draft, and if the car is turning a curve, as shown in Fig. 4, the clutch having been removed from the arm R′, it turns on the bolt R″, in the direction of the tongue, or draft, and the cross bar P, being at right angles to the arm R′, the curved rods and axles are adjusted accordingly, which is as follows: The curved rod H″, being connected with the end of the cross bar P, the bearing H, is forced along in the journal box R, and the outer end of the axle E′, is adjusted, by the bearing C, turning in the box B. In this way the axle E′, is brought at right angles to the line of draft, and the wheel E, adjusted to the curve of the road, the axle being in a line with the radius of a circle. As the axles E′, and N′, are connected by the curved rod H″, the bearing L, is forced along in the journal box J, and the axle N′, is turned at right angles to the curve of the road, the wheel N, is adjusted accordingly. The same movement of the cross bar P, that causes the axles E′, and N′, to take the position shown in the drawing, by means of the curved rods K′, and K″, connected with the other end of P, and similar to H′, and H″, causes the axles O′, and M′, to take the same relative position, as the axles E′, and N′. When the curve is to be turned, the driver places his foot on the spring I″, which removes the clutch from the arm R′, and retains it there until the car is again on the straight road. In this way the wheels and axles can be at once adjusted, from a straight to suit a curved track, or from one curve to another in the opposite direction, for the movement of the cross bar P, is immediately transmitted to all its working connection, changing the wheels axles and bearings, from the position shown in Fig. 3, to that, upon a curve in Fig. 4, and just in proportion to the curvature of the road, will the position of the cross bar P, be changed, and consequently the wheels and axles. It matters not in which direction, the curve is, if it is in the opposite direction, the wheels, axles and braces, will be changed, and be in the position shown by the dotted lines, in Fig. 4. As each wheel has an independent axle, constructed as described, it follows that the outside wheels, in turning a curve, can revolve as many more times, as they have a greater distance to travel, but if the opposite wheels have but one axis, the outer wheels have to slide along the surplus distance, which causes a jarring motion, and produces friction, that is so wearing on the machinery. As the car is not usually turned, an arm and cross bar, with braces, like K', and H', can be connected with the axles at the other end of the car, and in operation, will produce the same results.

Axles and wheels constructed and arranged, in this way can be adjusted, from a straight line, to suit a curve, and from a curve to a straight line, or from one curve to another, by the driver merely placing his foot on the spring I'', which pressure must be removed, as soon as they are moving in a straight line, for the clutch I, to which the spring is connected, holds the arm R', firmly in place. When a car is moving from a straight line to a curve, or from a curve to a straight line, the team changes the position of the axles, and adjusts them according to the curvature of the road.

What I claim as my invention and desire to secure by Letters Patent, is—

1. Giving a convex shape to the vertical sides of the journal-boxes C, C, and a concave shape to the inner surfaces of the respective legs of the pedestals B, B, for the purpose of enabling the said journal-boxes to be freely turned upon their verticel axes within the said retaining pedestals, in the manner and for the purpose herein set forth.

2. Supporting the journal-boxes that receive the inner ends of the divided axles, between the curved open edges of the way-plates J, R, that are bolted to the central beam G, of the car frame; but this I only claim when the boxes (C, C,) which receive the outer ends of the said divided axles, are supported in such a manner that they are allowed to turn upon their vertical axes substantially in the manner herein set forth.

SEBRE HOWARD.

Witnesses:
W. H. BURRIDGE,
HENRY VOTH.